United States Patent
Ronda et al.

[11] Patent Number: 5,171,043
[45] Date of Patent: Dec. 15, 1992

[54] HOSE FITTING

[75] Inventors: Ferdinando Ronda, Mortizza, Italy; Giovanni Coda, Ligornetto, Switzerland

[73] Assignee: Interplas, S.A., Switzerland

[21] Appl. No.: 863,785

[22] Filed: Apr. 6, 1992

[30] Foreign Application Priority Data

Apr. 19, 1991 [CH] Switzerland .......................... 1184/91

[51] Int. Cl.$^5$ .......................... F16L 35/00; F16L 33/23
[52] U.S. Cl. .......................... 285/81; 285/92; 285/242; 285/243; 285/322; 285/238
[58] Field of Search .................. 285/81, 92, 322, 323, 285/242, 243, 328, 238

[56] References Cited

U.S. PATENT DOCUMENTS

| | | | |
|---|---|---|---|
| 2,120,275 | 6/1938 | Cowels | 285/323 X |
| 3,248,135 | 4/1966 | Meripol | 285/323 |
| 3,781,941 | 1/1974 | MacFarland | 285/328 X |
| 4,212,487 | 7/1980 | Jones et al. | 285/243 |
| 4,335,908 | 6/1982 | Burge | 285/323 X |
| 4,405,163 | 9/1983 | Voges et al. | 285/322 X |
| 4,435,104 | 3/1984 | Held | 285/328 X |
| 4,462,653 | 7/1984 | Flederbach et al. | 285/82 X |
| 4,906,030 | 3/1990 | Yokomatsu et al. | 285/243 |
| 5,048,872 | 9/1991 | Gehring | 285/322 X |

Primary Examiner—Randolph A. Reese
Assistant Examiner—Heather Chun
Attorney, Agent, or Firm—Laurence R. Brown

[57] ABSTRACT

A hose fitting includes a clamping ring acting from the outside which upon an axial displacement moves clamping jaws mounted at a base body into an active or inactive position, whereby a plurality of control surfaces located at the base body in a circumferentially distributed manner and extending obliquely or inclined relative to the longitudinal axis of the body rest against correspondingly shaped counter surfaces of the clamping ring in such a manner that upon a rotating of the ring it moves axially and operates the clamping jaws.

4 Claims, 2 Drawing Sheets

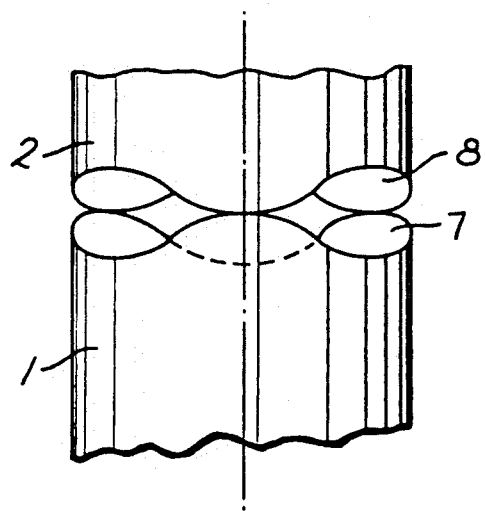
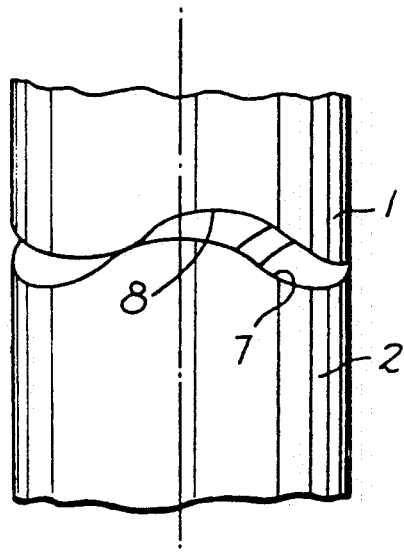
FIG. 3a          FIG. 3b
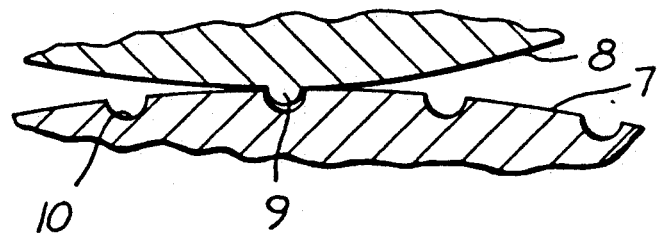
FIG. 4

HOSE FITTING

BACKGROUND OF THE INVENTION

1. Field of the Invention

The present invention relates to a hose fitting, specifically for pressureless plastic hoses such as protective sheaths for electric cables, having a cylinder shaped base body including conical clamping jaws, which base body is adapted to receive and arrest by means of the clamping jaws a hose end inserted thereinto, and including an axially displaceable clamping ring adapted to act from the outside onto the clamping jaws in order to move them into an active position against the hose inserted inside of the clamping jaws.

2. Description of the Prior Art

Hose fittings are used for connecting a hose to a corresponding connector or a further length of a hose in a multitude of applications. A great many of hose fitting of vastly different designs are known for the large number of different hoses. Practically all designs have in common that the tube shaped end of the hose must be connected to the casing of the fitting whereby in practically all fields of application this connection must be closed off in a sealed manner. In most of the known practical designs the end of the hose which is cut off perpendicularly relative to its axis is pressed against a sealing surface in the casing of the fitting, and is arrested for instance by a cap nut which is screwed into a thread located at the casing of the fitting, whereby a clamping ring positioned between a cap nut and the jacket of the hose is displaced axially and clamps the jacket of the hose against a counter surface. Such connections can be realized very reliably and have a large resistance against a tearing of the hose out of the casing of the fitting. However, the expenditures for producing such fittings are relatively high because on the one hand a plurality of individual parts such as the casing of the fitting, the cap nut and clamping ring must be produced, and on the other hand because the producing of the threads increases the production costs and leads to long production times.

A solution to use an outer clamping ring for clamping the hose not by means of a thread but merely by a manual axial displacing is known, too. This solution has however, the drawback that such a connection is not resistant against vibrations and can practically be used only for very small hose diameters.

SUMMARY OF THE INVENTION

Thus, it is a general object of the invention to provide a fitting which guarantees a reliable connection of the end of the hose and holds, thereby, the hose in an axially aligned manner, is easy to operate and can be produced in a very simple manner.

A further object is to provide a hose fitting in which the base body comprises a plurality of control surfaces distributed along its circumference and extending obliquely or inclined relative to the longitudinal axis of the base body, and in which the clamping ring includes correspondingly designed counter surfaces resting against the control surfaces in such a manner that upon a rotating of the ring it runs axially over the incline and operates thereby the clamping jaws.

This ensures not only a safe clamping of the hose, but at the same time keeps the hose exactly aligned axially (no oblique areas which would render a relative sealing questionable).

A further object is to provide a hose fitting in which the inclined extending control surfaces are of a wave shape each having a lowest and a highest region, preferably having three control surfaces of a same shape which extend successively in a sinusoidal manner along the circumference.

Such an embodiment is preferably characterized in that one or a plurality of recesses are positioned at the highest regions of the control surface into which a projection for instance inform of a hemisphere and located at a corresponding region of the counter surface can engage.

The hose fitting designed in accordance with the invention can be manufactured advantageously at low costs because it consists of only two parts and no thread at the connector is needed for mounting the hose. Also, the clamping of the hose by merely a rotating of the clamping ring can be accomplished quite simply and can transmit a sufficient clamping force also in case of larger hose diameters. By the placing of the recesses in the control surface the clamping ring can snap in at one of these positions and can, therefore, not disengage by itself.

BRIEF DESCRIPTION OF THE DRAWINGS

The present invention will be better understood and objects other than those set forth above, will become apparent when consideration is given to the following detailed description thereof. Such description makes reference to the annexed drawings, wherein:

FIGS. 3a and 3b illustrate purely schematically a variant of the hose fitting of FIG. 1, in which the control surfaces comprise each three sections extending in a sine-like fashion; and FIG. 4 illustrates purely schematically the locking mechanism between the control surfaces abutting each other in the clamping position.

DETAILED DESCRIPTION OF THE PREFERRED EMBODIMENTS

Figure 1:
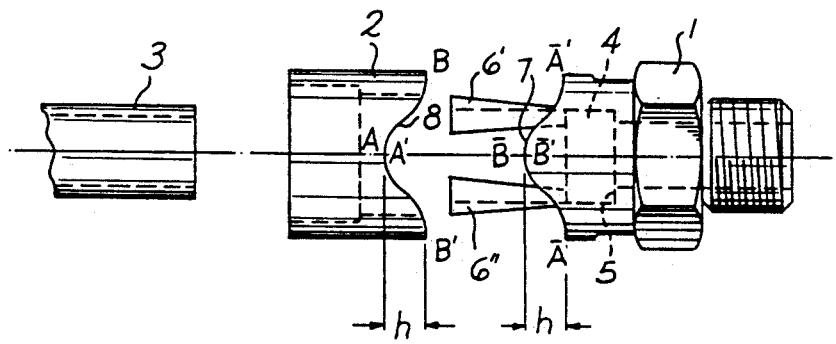
FIG. 1 is a side view of a fitting structured in accordance with the present invention.

FIG. 1 illustrates a side view of the base body 1 where the clamping ring 2 is not placed thereupon, and the hose end 3 to be inserted and clamped. One of the ends of the base body 1 is designed here as example in a well known way as threaded body with a hexagon portion. Obviously, all other known designs, such as axially rotatable connector parts, elbow, etc. are possible embodiments. In order to receive the hose end 3 the base body 1 includes a bore 4 having a sealing edge 5 (possibly also with a sealing ring positioned thereon) in accordance with known designs. Conical clamping jaws 6', 6'' (e.g. 4–12 jaws) are also located directly at the base body, which jaws include preferably arresting edges at their inner sides as safeguard against a tearing out of the hose. The circumferentially extending inclined control surface 7 is visible outside of the clamping jaws, which control surface 7 has two lowest A, A' and two highest B, B' regions. In the illustrated example the control surface 7 is designed in a wave shaped form in such a manner that two lowest and two highest regions are present. This has the advantage that when rotating the clamping ring 2 having a mating counter surface 8 at any given time, at least two regions of these surfaces control each other. In the embodiment illustrated in FIG. 1 the control surface 7 and the counter surface 8 contact each other in the closed position at any arbitrary rotated position respectively only at the two highest regions of the circumference.

Figures 2A, 2B, 2C:
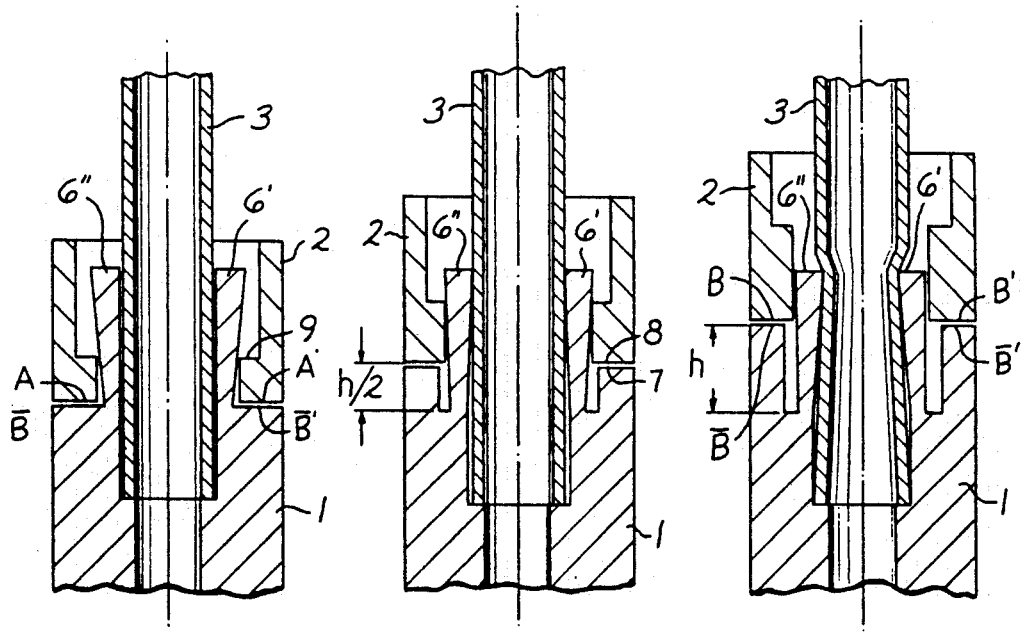
FIGS. 2a–c illustrate three sections through a hose fitting corresponding in principle to the one of FIG. 1, at different rotational positions of the clamping ring (initial position; rotated by 45°; by 90°)

FIG. 2a illustrates a cross section through a hose fitting comparable with the one of FIG. 1 whereby the clamping ring 2 is rotated into its lowest position (initial position), at which the clamping jaws 6', 6" are in their widest open position. Accordingly, the hose end 3 can be inserted through the opening into the bore 4 and be pressed against the sealing edge 5. By a rotating of the clamping ring 2 by 45° it is moved axially upwards and the edge 9 of the clamping ring 2 acts against the clamping jaws 6', 6" which are pressed against the wall of the hose end 3 such as illustrated in FIG. 2b.

The greatest clamping effect is obtained at the position illustrated in FIG. 2c (ring rotated by 90°) whereby the control surface 7 contacts itself at its highest region B, B' of the counter surface. In this position the clamping jaws 6', 6" press into the wall of the hose end 3 to the largest depth and arrest the hose end 3 in the hose connector. By a further rotating in the same or opposite direction the clamping ring is again moved downwards under the action of the clamping jaws 6', 6" wherewith the hose end 3 can be pulled out of the hose connector.

Specifically advantageous is a design of the clamping ring where its outer surface is structured, for instance grooved, in order that the force needed for the rotating can be applied without tools and rather manually. It is also of advantage to have the outer surface extend downwards over the cylinder shaped part of the base body such to provide a safe guide for the clamping ring and also to protect the control and counter surfaces against dirt.

In order to prevent the clamping ring from rotating on its own, recesses can be foreseen at the region of the highest elevation of the control surface (see FIG. 4) into which corresponding projections at the counter surface can snap. When several such recesses are arranged, it is possible to use hose diameters of a certain tolerance together with the same hose fitting. The tolerance is determined by the range of the clamping property of the clamping jaws and the respective snap-in areas for the clamping ring present.

The described clamping ring design can be specifically simply produced from a plastic material by a few production steps at low costs.

FIGS. 3a and 3b illustrate a coupling in which the control surfaces 7, 8 of the base body 1 and the clamping ring 2 extend sine-shaped and include three bulges and recesses respectively.

This design ensures that during a rotating of the ring 2 it displaces itself exactly relative to the base body (no tipping).

While there are shown presently preferred embodiments of the invention it is to be distinctly understood that the invention is not restricted to same, but may be variously embodied and practiced within the scope of the following claims.

We claim:

1. A host fitting, specifically for pressureless plastic hoses such as protective shaped sheaths for electric cables, said fitting having a cylinder shaped base body about which extends a plurality of conical clamping jaws, which said bas body is adapted to receive and arrest a cylindrical hose end inserted inside the clamping jaws, and including an outer axially displaceable clamping ring surrounding the clamping jaws and hose end for moving the jaws inwardly into an active position against the hose end inserted inside the clamping jaws, in which said base body comprises a first plurality of jaw control cam surfaces distributed around the base body circumference, said jaw control surfaces being inclined relatively to a plane normal to the longitudinal cylindrical axis of the base body, and in which said clamping ring includes counter control cam surfaces for mating against said jaw control surfaces in such a manner that upon a rotating of the ring the clamping ring moves axially to compress said clamping jaws inwardly toward the hose end.

2. The hose fitting of claim 1, in which said clamping ring includes groove on its outer surface.

3. The hose fitting of claim 1, in which said control surfaces comprise three sinusoidal waves with a lowest and a highest region, about the circumference.

4. The hose fitting of claim 3, in which a plurality of detent recesses are positioned about the highest regions of the jaw control surface, and a projection in form of a hemisphere is located at a corresponding highest region of the mating counter surface for detenting therewith.

* * * * *